(12) United States Patent
Mouch et al.

(10) Patent No.: US 7,267,394 B1
(45) Date of Patent: Sep. 11, 2007

(54) FRONT END TUBULAR STRUCTURE FOR UNITIZED BODY VEHICLES

(75) Inventors: Tim Mouch, Troy, MI (US); Michael Azzouz, Livonia, MI (US); Musa Azzouz, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 11/148,101

(22) Filed: Jun. 8, 2005

Related U.S. Application Data

(63) Continuation-in-part of application No. 10/859,687, filed on Jun. 3, 2004, now Pat. No. 7,066,533.

(51) Int. Cl.
*B62D 21/02* (2006.01)

(52) U.S. Cl. .......................... 296/203.02; 296/187.09; 296/193.09; 296/205; 296/29

(58) Field of Classification Search .......... 296/203.01, 296/203.02, 205, 192, 187.09, 193.09, 29, 296/193.06; 180/68.4
See application file for complete search history.

(56) References Cited

U.S. PATENT DOCUMENTS

| | | | |
|---|---|---|---|
| 4,573,734 A | 3/1986 | Gass | |
| 4,840,423 A * | 6/1989 | Maekawa | 296/203.02 |
| 4,900,083 A | 2/1990 | Kumasaka | |
| 4,909,565 A * | 3/1990 | Harasaki et al. | 296/187.09 |
| 5,201,566 A * | 4/1993 | Mori | 296/192 |
| 5,271,473 A * | 12/1993 | Ikeda et al. | 180/68.4 |
| 5,303,973 A * | 4/1994 | Fujii | 296/203.02 |
| 5,458,393 A * | 10/1995 | Benedyk | 296/203.01 |
| 6,068,330 A * | 5/2000 | Kasuga et al. | 296/187.09 |
| 6,092,865 A * | 7/2000 | Jaekel et al. | 296/205 |
| 6,099,071 A * | 8/2000 | Kasuga et al. | 296/205 |
| 6,193,273 B1 * | 2/2001 | Novak et al. | 280/781 |
| 6,302,478 B1 * | 10/2001 | Jaekel et al. | 296/205 |
| 6,332,642 B1 * | 12/2001 | Hanyu | 296/203.02 |
| 6,375,252 B1 * | 4/2002 | Cheron et al. | 296/203.02 |
| 6,382,709 B1 * | 5/2002 | Chirifu et al. | 296/193.1 |
| 6,409,255 B2 * | 6/2002 | Tilsner et al. | 296/187.09 |
| 6,416,119 B1 * | 7/2002 | Gericke et al. | 296/205 |
| 6,533,348 B1 * | 3/2003 | Jaekel et al. | 296/205 |
| 6,672,652 B2 * | 1/2004 | Takeuchi et al. | 296/193.09 |
| 6,681,876 B1 * | 1/2004 | Haneda et al. | 180/68.4 |
| 6,705,670 B2 * | 3/2004 | Forssell et al. | 296/187.09 |
| 6,712,426 B2 * | 3/2004 | Ritchie et al. | 296/187.09 |
| 6,729,008 B2 * | 5/2004 | Nishijima | 29/458 |

(Continued)

*Primary Examiner*—Dennis H. Pedder
*Assistant Examiner*—Greg Blankenship
(74) *Attorney, Agent, or Firm*—Gigette Bejin; Miller Law Group, PLLC

(57) ABSTRACT

A tubular front end structure for use with a unitized automotive frame. The tubular front end structure includes a pair of upper frame rail members that are welded to the A-pillar at vertically spaced positions. A first upper rail member provides support for the fender and bends downwardly and forwardly to support tubular upper and lower radiator supports. The other upper rail member connects to the other upper rail member and bends downwardly to connect with the lower frame rail at an intermediate position to provide support for the shock tower. The lower frame rail is formed with an "S-bend" to correspond to the shape of the unitized automotive frame and includes a bracket attached thereto at the S-bend to increase the section properties of the lower frame rail as required to maintain the section properties of the replaced frame structure.

19 Claims, 9 Drawing Sheets

U.S. PATENT DOCUMENTS

| | | |
|---|---|---|
| 6,926,350 B2 * | 8/2005 | Gabbianelli et al. ... 296/203.01 |
| 6,948,767 B2 * | 9/2005 | Makita et al. ......... 296/187.09 |
| 6,957,845 B2 * | 10/2005 | Rager ....................... 296/146.9 |
| 7,008,007 B2 * | 3/2006 | Makita et al. ......... 296/187.09 |
| 7,014,257 B2 * | 3/2006 | Lazzeroni et al. ..... 296/203.02 |
| 7,036,874 B2 * | 5/2006 | Stojkovic et al. ...... 296/193.09 |
| 7,052,076 B2 * | 5/2006 | Kim ....................... 296/187.09 |
| 7,185,724 B2 * | 3/2007 | Dupuis et al. ............. 180/68.5 |
| 2005/0077711 A1 * | 4/2005 | Yasui et al. ................. 280/735 |

\* cited by examiner

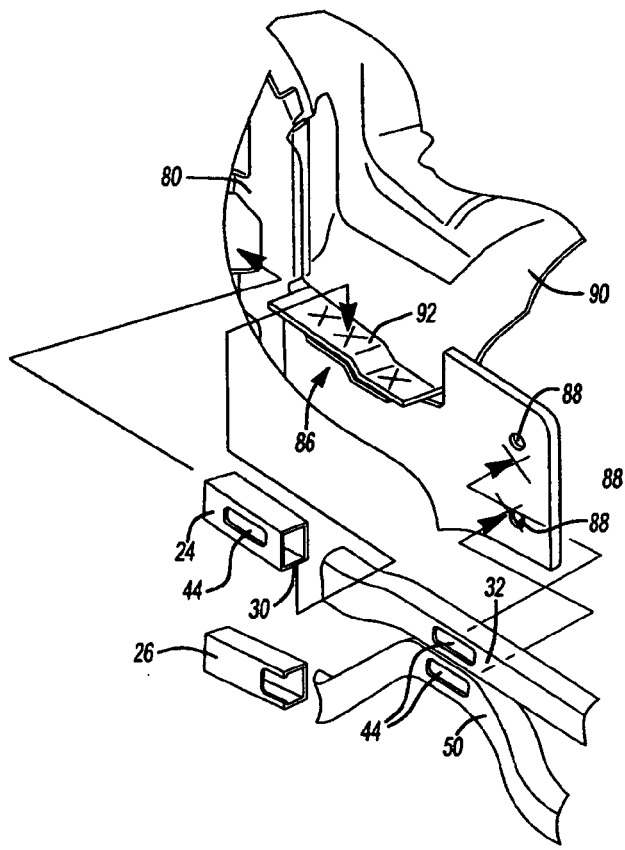
Fig. 4
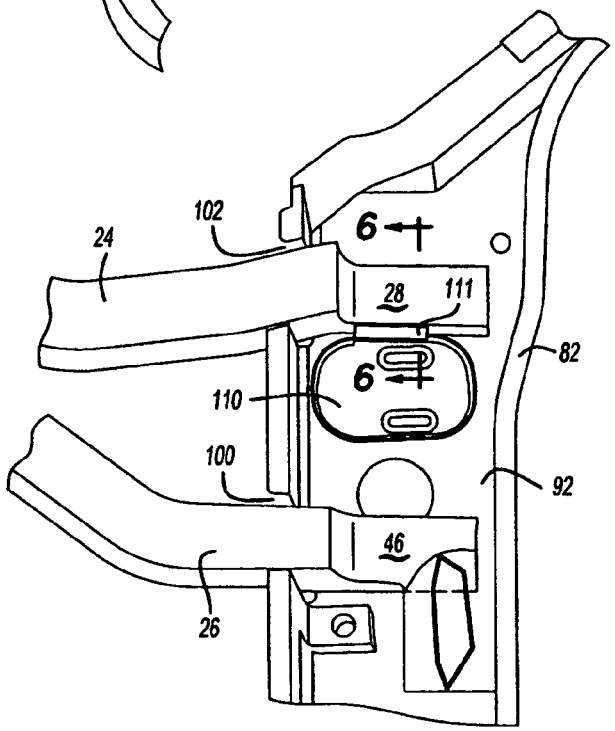
Fig. 6
Fig. 5

US 7,267,394 B1

FRONT END TUBULAR STRUCTURE FOR UNITIZED BODY VEHICLES

CROSS-REFERENCE TO RELATED APPLICATIONS

This application is a continuation-in-part of U.S. patent application Ser. No. 10/859,687, filed Jun. 3, 2004, now U.S. Pat. No. 7,066,533.

BACKGROUND OF THE INVENTION

The present invention relates to a front end assembly for an automobile vehicle and, more particularly, to a hydro-formed tubular front end structure for use with unitized frame vehicles.

Conventional front end assemblies are often made by stamping and welding together several individual frame components. One of the major challenges for manufacturing is to maintain rigidity, improved geometric dimensional control and tighter tolerancing because these assemblies are often a combination of a number of various frame parts. As each of the frame parts are attached to form subassemblies and then are attached to the body portion of the vehicle, it becomes more difficult to achieve the necessary or desired stiffness while maintaining improved geometric dimensional control and tighter tolerancing in the front end.

Hydro-formed tubular elements are increasingly being used in the construction of vehicle body structures. Hydroforming is a metal forming process that uses high-pressure fluids to outwardly expand tubular blanks to conform with the surfaces of a die cavity of a die assembly to form a contoured hydro-formed part.

Vehicle front end assembly processes have yet to take full advantage of the capabilities of tubular hydro-formed parts. A number of prior patents have described the use of tubular members in hybrid front end assemblies, but fail to address the matchboxing issue. For example, U.S. Pat. No. 6,416,119, granted on Jul. 9, 2002 to Dean Gericke, et al, describes a vehicle front end constructed through the use of hydro-formed tubes. In Gericke, a first body structure formed from a plurality of tube members and a second body structure formed from sheet metal are welded to each other in a sandwiching relationship. However, this method is still subject to matchboxing because the sheet metal structure can be distorted as it is secured to the tube members.

Other attempts at a tubular frame structure can be seen in U.S. Pat. No. 6,068,330, issued to Tatsuo Kasuga, et al, on May 30, 2000, in which the front end frame is formed by four members and is connected to tubular side frame members having internal ribs passing through the center axis thereof. Like Kasuga, the radiator supports are detachably mounted on front end frame members in U.S. Pat. No. 5,271,473, issued to Yoshinori Ikeda, et al, on Dec. 21, 1993. In U.S. Pat. No. 6,409,255, issued on Jun. 25, 2002, to Michael Tilsner, et al, tubular members are attached to the A-pillar to support the fender which is attached thereto by bolts.

Upper and lower frame rails are attached to a unitized frame in U.S. Pat. No. 4,573,734, issued to Gene Gass, et al, on Mar. 4, 1986. Modular frame components are disclosed in U.S. Pat. No. 4,900,083, issued to Hideyuki Kumasaka, et al, on Feb. 13, 1990, including the connection of longitudinally extending tubular members to the vehicle main body by a reinforcement. A tubular automotive frame apparatus is taught in U.S. Pat. No. 5,458,393, issued to Joseph Benedyk on Oct. 17, 1995.

There is a need for a front end construction that may incorporate the use of hydro-formed tubes that provides superior stiffness and rigidity when compared to conventional vehicle front end assembly designs. There is a further need for a front end assembly process that minimizes any tendency of the assembly to distort or matchbox. There is also a need to eliminate structural reinforcements, reduce part counts, and improve the durability of the vehicle body. Adaptation of a tubular front end structure to a unitized frame is desirable in order to reduce manufacturing cost, while retaining or improving crash performance characteristics. Furthermore, the utilization of tubular, hydroformed, front end components can facilitate the use of modules to be attached to the tubular members to further enhance manufacturing efficiencies.

Accordingly, it would be desirable to provide a tubular, hydroformed front end structure for automobiles that can be adapted for use in conjunction with unitized automotive frames.

SUMMARY OF THE INVENTION

It is an object of this invention to overcome the aforementioned disadvantages of the known prior art by providing a tubular hydroformed front end structure for the unitized frame of an automotive vehicle.

It is a feature of this invention to provide a front end structure that includes upper tubular rails that extend from the A-pillar of the automotive frame to the radiator support.

It is an advantage of this invention that the upper frame rails can support modular components and provide support for fenders and shock towers.

It is another advantage of this invention that the crash performance of the tubular front end structure is enhanced due to the ability of the tubular components to transfer impact forces throughout the frame of the vehicle.

It is another feature of this invention that the upper frame rails are formed as two members, one of which extends from the A-pillar, connects to the other upper frame rail member and also connects to the lower frame rail to tie the upper and lower frame rail structures together and to provide support for the shock tower.

It is still another feature of this invention that the tubular front end structure incorporates a lower frame rail along each respective side of the automobile and is connected to both upper frame rail members.

It is a further advantage of this invention that the lower fame rail, the two upper frame rail members and the shock tower can be formed as a separate assembly to be mounted to the unitized frame of an automobile as a module.

It is still a further advantage of this invention that the use of hydroformed tubular members for manufacture of the automotive front end structure permits a number of more costly stamped and welded frame components to be deleted from the manufacture of an automobile.

It is yet another feature of this invention that the lower frame rail can be fitted with a bracket to increase the section at the bend of the lower frame rail to maintain section properties corresponding to the stamped frame components the lower frame rail replaces.

In one aspect of this invention, the front end structure is formed from a pair of upper frame rail members and a lower frame rail corresponding to each respective side of the automobile. The upper frame rail supports tubular upper and lower radiator supports extending between the opposing corresponding upper frame rail members. The upper frame rail members are welded to the A-pillar at vertically spaced positions to provide stability.

In another aspect of this invention the upper frame rail members and the supported shock tower are assembled as a single modular component to be utilized in the assembly of the automotive frame. In such a configuration, the lower frame rail and sectional bracket are installed as a separate modular component. In a different, preferred configuration, the upper frame rail members, lower frame rail, shock tower, sectional bracket, and other subframe mounting brackets are provided for each side of the automotive frame as a separate modular component for assembly with the unitized frame. Upper and lower tubular radiator supports, preferably formed through a hydroforming manufacturing process, are connected to the opposing upper frame rail members at a forward location.

These and other objects, features and advantages are accomplished according to the instant invention by providing a tubular front end structure for use with a unitized automotive frame. The tubular front end structure includes a pair of upper frame rail members that are welded to the A-pillar at vertically spaced positions. A first upper rail member provides support for the fender and bends downwardly and forwardly to support tubular upper and lower radiator supports. The other upper rail member connects to the other upper rail member and bends downwardly to connect with the lower frame rail at an intermediate position to provide support for the shock tower. The lower frame rail is formed with an "S-bend" to correspond to the shape of the unitized automotive frame and includes a bracket attached thereto at the S-bend to increase the section properties of the lower frame rail as required to maintain the section properties of the replaced frame structure.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a fragmentary perspective view of a portion of a front end assembly made according to one embodiment of the present invention;

FIG. 5 is a fragmentary interior side elevation view of an A-pillar attached to two tubular frame members according to one embodiment of the present invention;

FIG. 6 is a cross-sectional view taken along the line 6-6 in FIG. 5;

FIG. 15b is a schematic representation of the mounting of a rear subframe mount on the lower frame rail according to the principles of the instant invention, corresponding to the structure depicted in FIG. 15a.

DETAILED DESCRIPTION OF THE PREFERRED EMBODIMENTS

Figure 1:
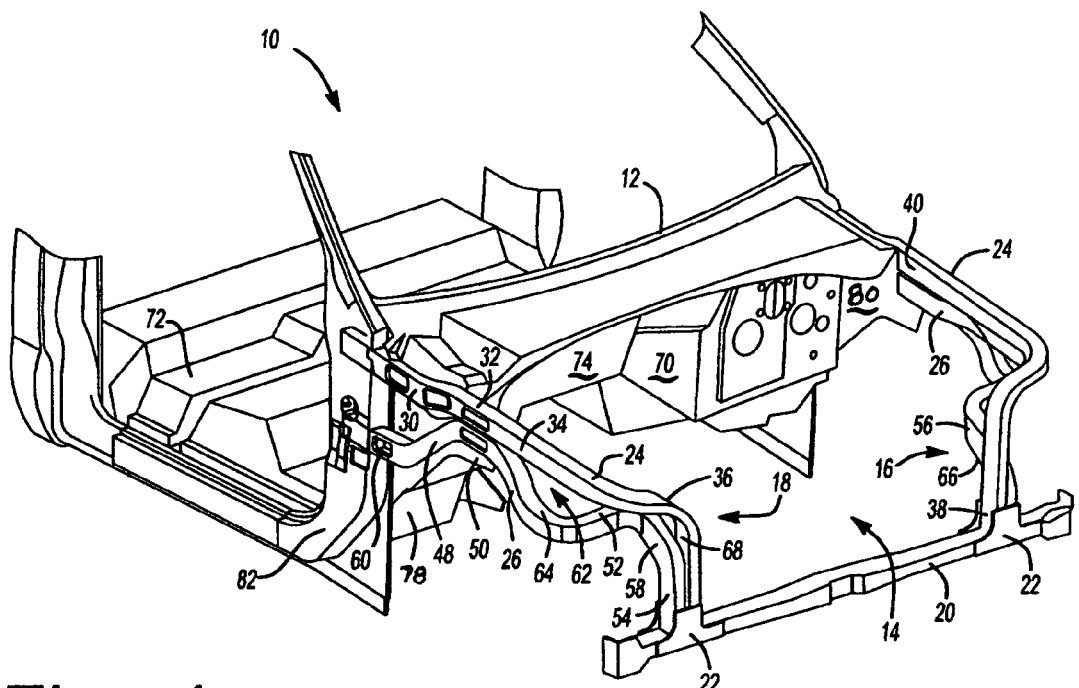
FIG. 1 is a perspective view of an improved front end assembly made according to one embodiment of the present invention.

Referring to FIG. 1, an improved front end assembly for a vehicle is generally identified by reference numeral 10. The front end assembly 10 comprises a body portion 12 and a U-shaped tubular structure 14. The U-shaped tubular structure 14 comprises a left side tube structure 16, a right side tube structure 18 and a radiator support tube structure 20. Right and left side designations as used herein refer to the sides of the vehicle relative to the driver of the vehicle. The side tube structures 16,18 are mirror images of each other. Each side tube structure 16,18 extends in a longitudinal direction generally further forward of the body portion 12 to a radiator support structure 20. The radiator support structure 20 generally extends transversely across the front of the vehicle and perpendicular to the longitudinal direction of the side tube structures 16 and 18. Each side tube structure is independently connected to the radiator support structure 20 by a U-shaped bracket 22 or similar connector. The tubes are hydroformed. They can also be formed from extrusions, seamless tubes or seamed tubes. The tubes may be formed with varying thicknesses throughout their length to save weight.

Figure 2:
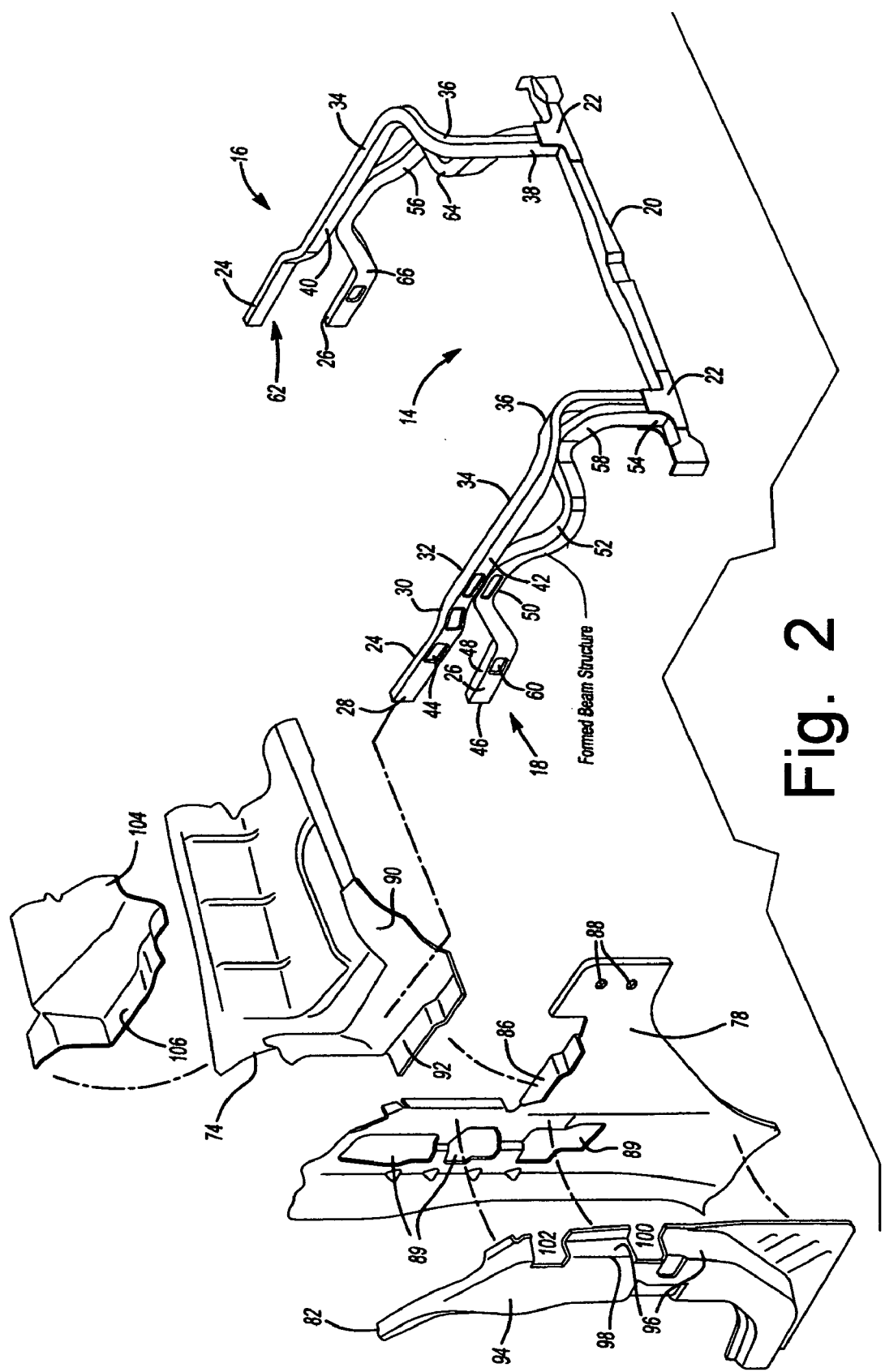
FIG. 2 is an exploded perspective view of an improved front end assembly according to one embodiment of the present invention.

Referring to FIGS. 1 and 2, the left and right side tube structures each comprise an upper tube 24 and a lower tube 26. Each upper tube 24 comprises a body end 28, a first connecting point 30, a second connecting point 32, a support portion 34, an upper cooling portion 36, and a front end 38. The upper tube 24 has an inboard surface 40 and an outboard surface 42. The outboard surface 42 has a plurality of access holes 44 that provide clearance for installation as well as performing securing operations. The upper tube 24 extends from a higher relative vertical position to a lower vertical position between the upper cooling portion 36 and the front end 38. The front end 38 is attached to the radiator support tube 20.

Each lower tube 26 of the left and right side tube structures 16,18 comprises a body end 46, a first connecting point 48, a second connecting point 50, a support portion 52, and a front end 54. Each lower tube 26 has an inboard surface 56 and an outboard surface 58. The lower tube has a plurality of access holes 60 that provide access for installation and for performing welding or other assembly operations associated with the assembly of the front end.

The lower tube 26 and the upper tube 24 are secured together in order to form each of the side tube structures 16,18. In the preferred embodiment of FIG. 1, a bottom surface 62 of the upper tube 24 and a top surface 64 of the lower tube 26 are secured to each other along the respective surfaces to allow the upper tube second connecting point 32 and the lower tube second connecting point 50 to be disposed in close proximity to each other. Furthermore, an inboard surface 66 of the lower tube 26 and an outboard surface 42 of the upper tube 24 are secured together in close proximity to the upper tube front end 38 and the lower tube front end 54 respectively. The upper tubes 24 and the lower tubes 26 extend longitudinally toward the front of the vehicle and joined together prior to connecting to the radiator support tube 20. The upper tube 24 is formed to be inboard of the lower tube 26 such that the upper tube front end 38 is disposed in a vertical plane inboard of the upper body end 28. Similarly, the lower tube front end 54 is located in a vertical plane more inboard than the lower tube body end 46.

The body portion 12 will now be further described. A dash structure 70 and an underbody structure 72 are joined together. A cowl inner structure 74 is attached along the forward portion of the dash 70. A pair of cowl sides 78, 80 are each attached longitudinally to the dash 70 and cowl inner 74.

A pair of laterally-spaced A-pillars 82,84 is positioned such that each is outboard of the respective cowl side. The left and right cowl sides 80, 78 and the left and right A-pillars 84,82 are mirror images of each other. The right A-pillar 82 is shown attached to the right cowl side 78, the dash structure 70, and the underbody structure 72. Body portion 12 may be formed from sheet metal or structural plastic components that are combined to form an assembly.

FIG. 2 is an exploded view of a partial side perspective of one embodiment of the invention. The right cowl side 78 includes a cowl side flange 86 that extends in an outboard direction and forms essentially a 90 degree angle with the cowl side 78. A portion of the right cowl side 78 extends forward longitudinally and contains a second securing point 88. A plurality of vertical clearance holes 89 are formed in each cowl side to allow for thru access to the A-pillar 84 (described below).

Referring to FIGS. 1 and 2, the cowl inner 74 is the part of the body portion 12 extending laterally in a horizontal plane between the pair of cowl sides 78,80. Referring to FIG. 2, a portion of the cowl inner 74 shows a peripheral flange 92 extends in an outboard direction from an end portion 90 of the cowl inner 74.

Each A-pillar 82,84 comprises a sidewall 94 that extends generally in a vertical and longitudinal plane. A transverse wall 96 extends inwardly from a forward edge 98 of the A-pillar towards the cowl side inner 78. The transverse wall 96 has a lower clearance opening 100 and an upper clearance opening 102 separated by a portion of the transverse wall 96.

A cowl top 104 is shown extending across the top of the cowl inner 74. The cowl top 104 is attached to the cowl inner 74 and the cowl side 78. A formed flange 106 is provided on each end of the cowl top 104.

Figure 3:
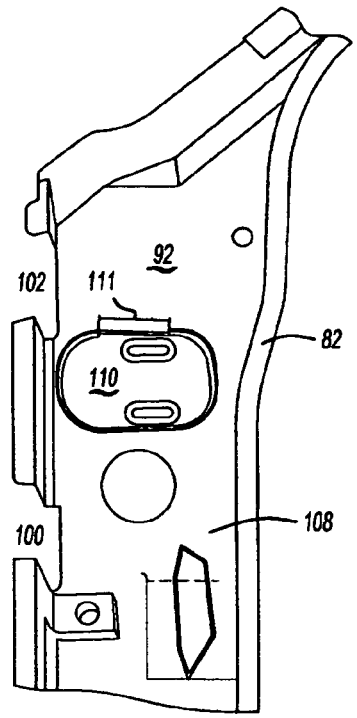
FIG. 3 is a fragmentary interior side elevation view of an A-pillar made according to one embodiment of the present invention.

Referring to FIG. 3, an interior surface 108 of the sidewall 94 of the right A-pillar 82 is shown supporting a hinge reinforcement bracket 110. Bracket 110 is attached to the interior surface 108 of each A-pillar. The bracket 110 is attached to the A-pillar 82 by either fasteners or a welding process. A perpendicular flange 111 of the upper hinge reinforcement bracket 110 extends inwardly from the interior surface 108. The flange is located to be level with the lower edge of the clearance opening 102.

The body portion 12 and the U-shaped tubular structure 14 connections shall be described in detail with specific reference to FIGS. 1, 2, and 4. The body portion comprises the underbody structure 72, the dash structure 70, the cowl inner 74, and the left and right cowl sides 80,78 that are assembled together. FIG. 1 shows the cowl inner 74 attached to the left cowl side 80 and the right cowl side 78. A right cowl end portion 90 contains a peripheral flange 92 which is fabricated to mate with the corresponding cowl side flange 86 located on each cowl side 78, 80.

FIG. 4 is a fragmentary view of a portion of the front end assembly in its final position. The cowl side flange 86 and the peripheral flange 92 are secured together. The upper tube 24 rests on top of the peripheral flange 92. The first connecting point 30 is disposed on the peripheral flange 92. Each upper tube can be secured to each peripheral flange 92 by conventional means through the access hole 44. The second securing point 88 located on each cowl side is disposed adjacent to the upper tube second connecting portion 32 and the lower tube second connecting point 50. Access holes 44 in the upper and lower tubes provide for the use of conventional securing methods such as spot welding to be used.

Referring to FIG. 5, the right A-pillar 82 is assembled to the body end portion 46 and body end portion 28 of the U-shaped tubular structure 14. The upper tube 24 passes through the forward clearance opening 102 of the A-pillar and rests on the flange surface 111 of the upper hinge reinforcement bracket 110. The lower tube 26 extends through the lower clearance opening 100 of the A-pillar 82 and contacts the A-pillar sidewall 94 to which it is secured.

Referring to FIG. 6, the upper tube 24 is shown resting on the flange 111 of the hinge reinforcement bracket. The upper tube may be secured to both the sidewall 92 and the flange 111 by spot welding or another conventional securing method.

Figure 7:
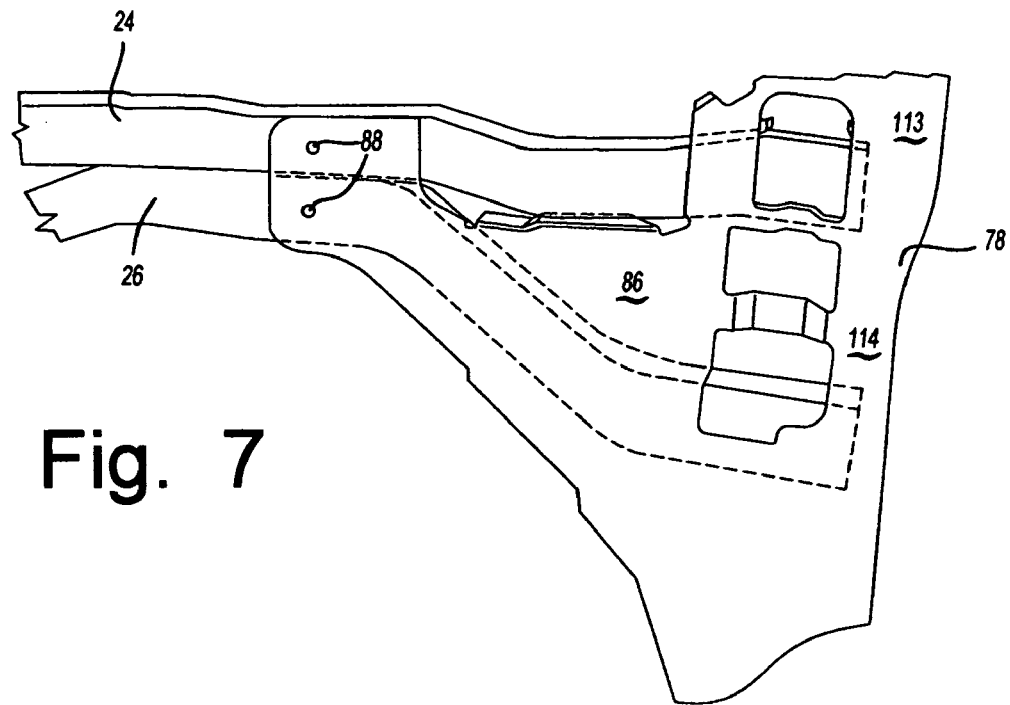
FIG. 7 is a fragmentary interior side elevation view of a cowl panel attached to two tubular frame members according to one embodiment of the present invention.

Referring to FIG. 7, an interior side view of the cowl side 78 attached to the upper and lower tubes 24,26 will be described. The upper and lower tubes 24,26 are secured at the second securing point 88. The upper tube 24 is supported by the cowl side flange 86. An upper access hole 113 and a lower access hole 114 are provided in the cowl side 78. Access holes 113 and 114 are aligned with the upper and lower tubes 24 and 26, respectively, to provide access for assembly operations.

Figure 8:
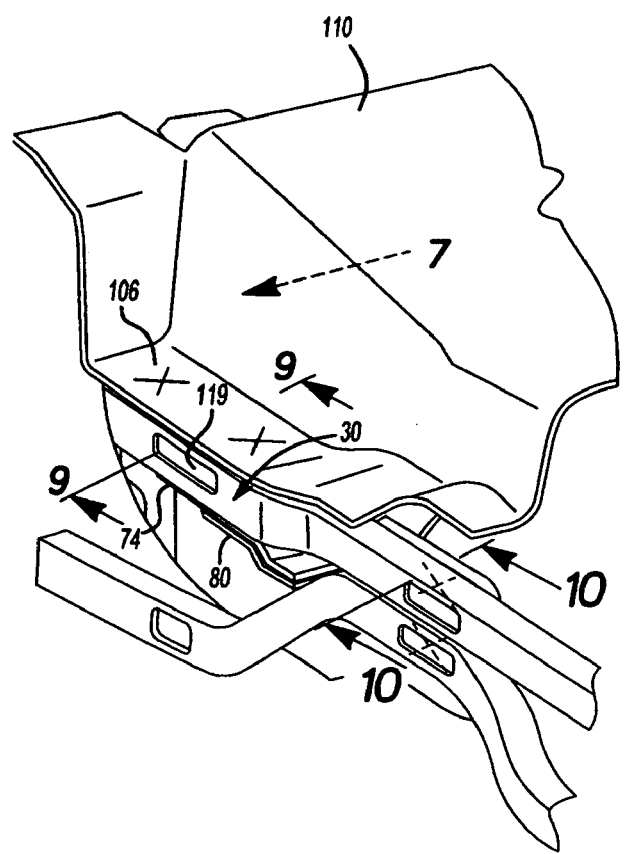
FIG. 8 is a fragmentary perspective view of an improved front end assembly made according to one embodiment of the present invention.
Figure 9:
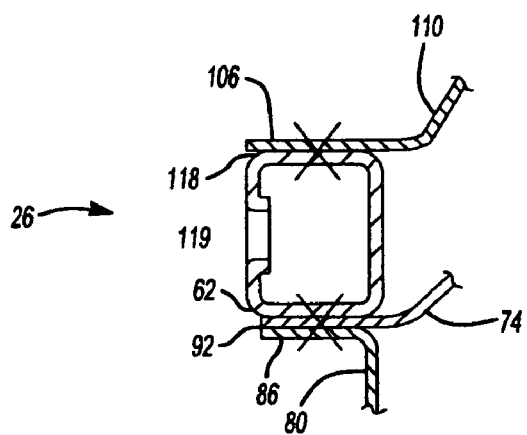
FIG. 9 is a cross-sectional view taken along the line 9-9 in FIG. 8.

Referring to FIGS. 8 and 9, the cowl top 110 is disposed over the top of the cowl inner 74. The cowl top flange 106 located on each end of the cowl top 110 is aligned with a top surface of the upper tube 118 adjacent to the first connecting point 30. Upper tube 26 has an access or clearance hole 119 in its outboard surface for securing the cowl top flange 106 to the upper tube top surface 118. The access hole 119 also provides for securing the upper tube bottom surface 62 to both the cowl inner peripheral flange 92 and the cowl side flange 86.

Figure 10:
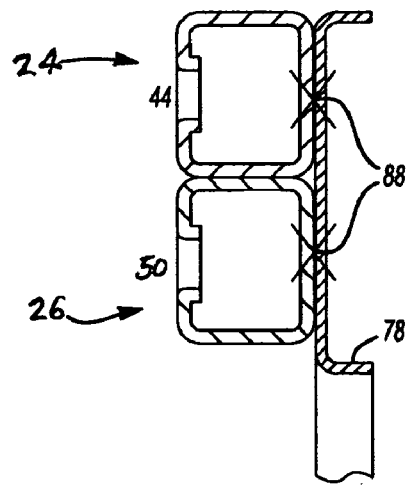
FIG. 10 is a cross-sectional view taken along the line 10-10 in FIG. 8.
Figure 11:
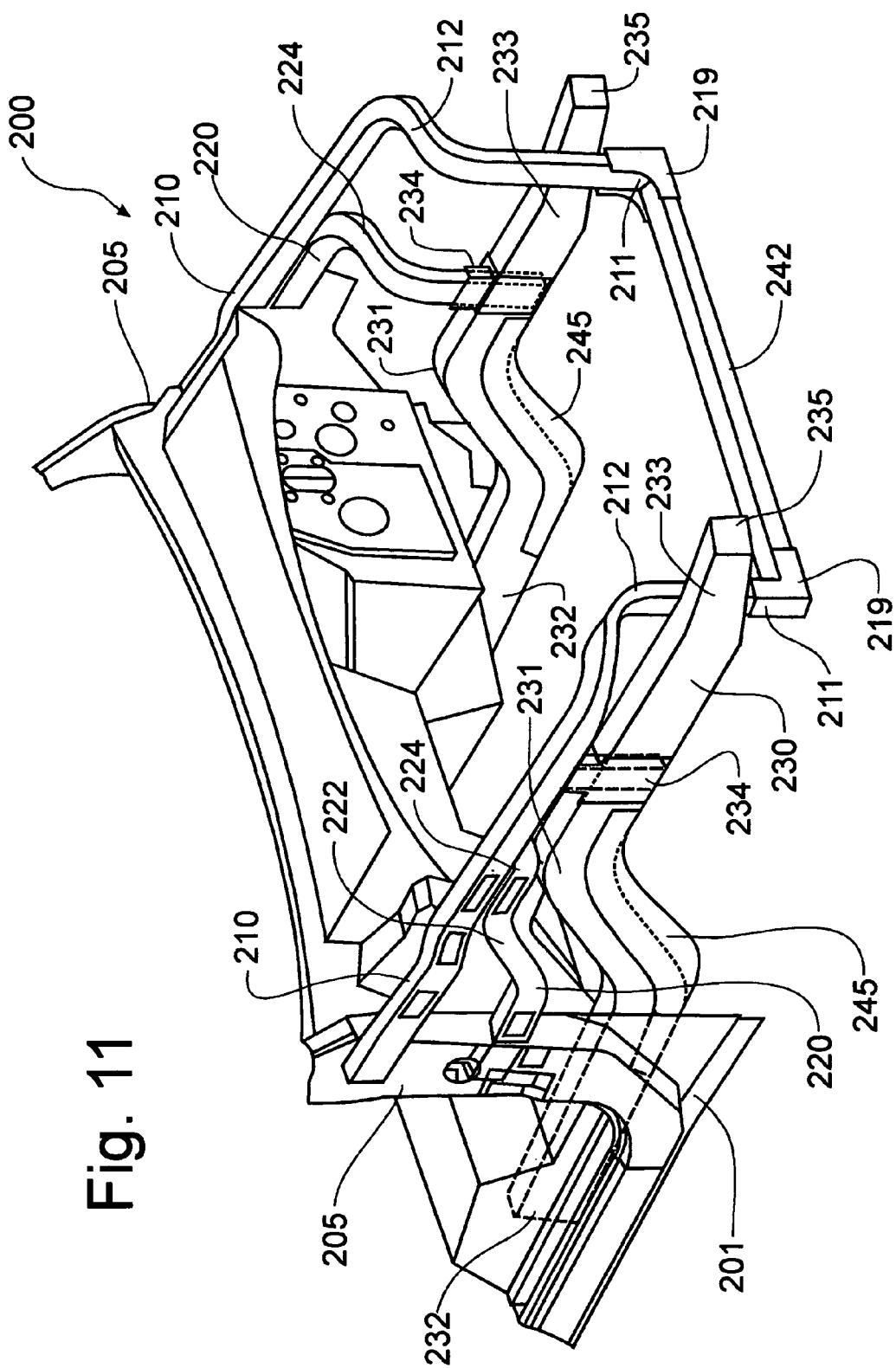
FIG. 11 is right side perspective view of the tubular front end structure for utilization with a unitized automotive frame incorporating the principles of the instant invention.

Referring to FIG. 10, a cross-sectional view taken along the line of 10-10 in FIG. 8 will now be described. The upper tube 24 and the lower tube 26 have clearance holes 44,50, respectively in their outboard surfaces to provide access for conventional securing tools to attach the tubes to the cowl side 78.

In an alternative embodiment of a front end assembly, the lower tube 26 and the upper tube 24 may be secured together in order to form each side tube structures similar to FIGS. 1 and 2 with each lower tube 26 of the left and right side tube structures 16,18 comprising a body end 46 moved further outboard than the upper tube body end 28. The vertical offset of the upper and lower tubes would provide further rigidity. Correspondingly, each of the A-pillar sidewalls and transverse walls would be mirror the offset to accommodate the upper and lower tubes.

A further embodiment of the invention can be seen in FIGS. 11-14 in which the tubular front end structure 200 is utilized with a unitized automotive frame 201. The tubular front end structure 200 includes a pair of upper frame rail members 210, 220. The first upper frame rail member 210 is welded to the A-pillar 205 at an upper position and extends forwardly therefrom to a forward position with respect to the front end structure 200. The first upper frame rail member 210 is bent at 212 to extend inwardly and downwardly to connect to a lower radiator support 242, as will be described in greater detail below.

Figure 12:
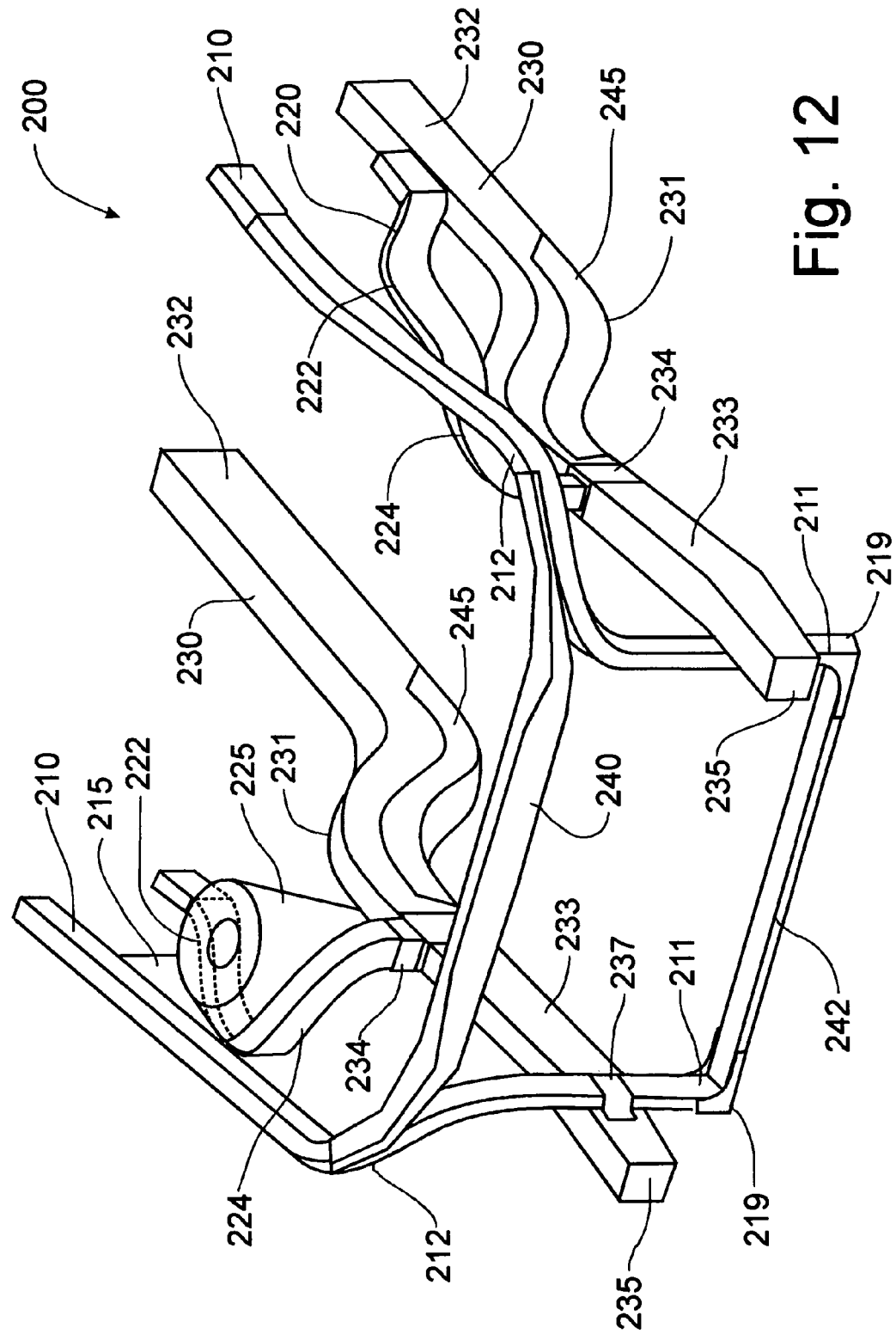
FIG. 12 is a left side perspective view of the tubular front end structure with the shock tower being depicted on the right side thereof.

The second upper frame rail member 220 is also welded to the A-pillar 205, but at a position spaced below the attachment of the first upper frame rail member 210 to provide positional stability for the upper frame rail structure. The second upper frame rail member 220 bends at 222 upwardly to come in close proximity to the first upper frame rail member 210 to permit the two upper frame rail members 210, 220 to be welded together or connected to the shock tower through a shear plate 215, best seen in FIG. 12. After connection with the first upper frame rail member 210, the second frame rail member 220 bends at 224 inwardly and downwardly to connect with the lower frame rail 230, as will be described in greater detail below. In making the upwardly bend at 222 and then the inward and downward bend at 224, the second upper frame rail member 220 is positioned to provide support for the shock tower 225, as is best seen in FIGS. 12 and 13.

Figure 13:
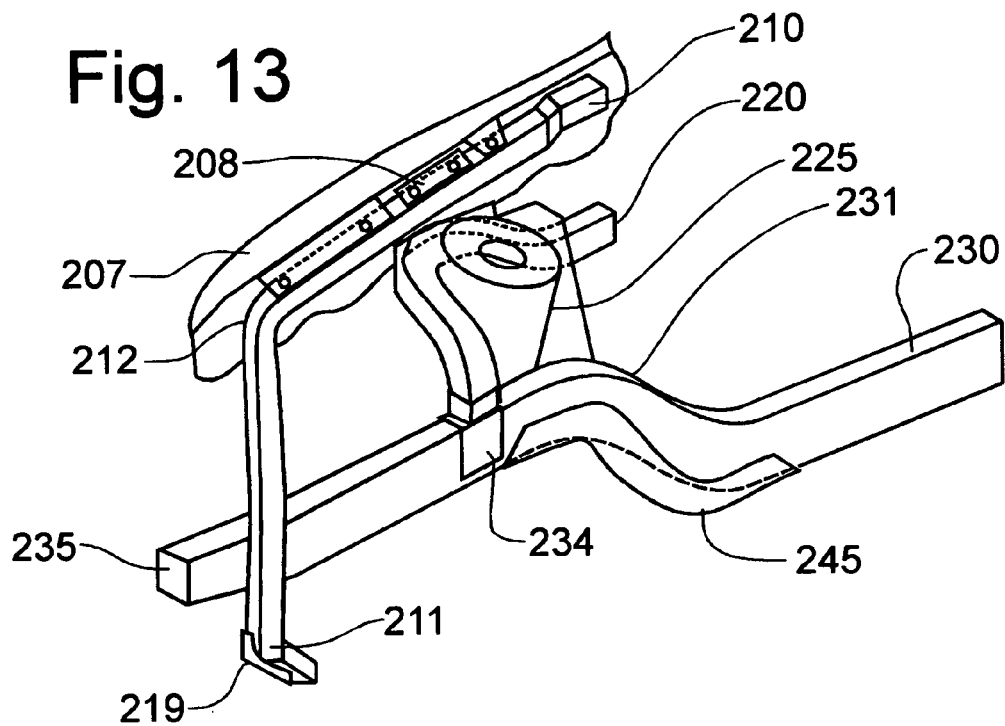
FIG. 13 is a left side perspective view of a preferred right side frame module incorporating the upper frame rail members, the lower frame rail, the shock tower and the section bracket for the lower frame rail, a portion of a fender and hood hinge being depicted as mounted on the first upper frame rail member.

As best seen in FIG. 13, the upper frame rails provide opportunity to support additional components for the automobile as a module, including attachment of the fender 207 and hood hinge 208 to the first upper frame rail member, and other operative components, such as an inner module comprised of the washer bottle, degass bottle, air conditioner accumulation vessel, power steering reservoir, etc. Other modules could include the air cleaner housing, the horn assembly and electrical distribution and/or fuse box.

Between the upper portions of the bends 212 in the opposing first upper frame rail members 210, an upper radiator support 240, preferably formed through a hydroforming process is attached to the opposing first upper frame rail members 210 to span between the opposing sides of the front end structure 200. Similarly, the distal ends 211 of the opposing first upper frame rail members 210 are fitted with an attachment bracket 219 to receive a lower radiator support member 242 which spans transversely between the opposing sides of the front end structure 200 at a location spaced below the upper radiator support 240. Preferably, the upper radiator support member 240 is welded to the opposing first upper frame rail members 210, while the lower radiator support member 242 is welded to the opposing attachment brackets 219.

The lower frame rail 230 is positioned interiorly of the corresponding upper frame rails 210, 220 and is welded to the A-pillar structure 205 to support the unitized frame 201. The lower frame rail 230 is formed to mate with the existing unitized frame structure 201 and includes an "S-bend" 231 forwardly of the A-pillar 205 to separate a rearwardly projecting portion 232 of the lower frame rail 230 from a forwardly extending portion 233 which is positioned vertically above the rearwardly extending portion 232. An attachment bracket 234 is welded to the forwardly extending portion 233 to receive the terminal end of the second upper frame rail member 220 for attachment to the lower frame rail 230. Each of the lower frame rail 230 terminates at a forward end 235 positioned forwardly of the bend 212 in the first upper frame rail member 210 to provide support for the vehicle's bumper (not shown). A third attachment bracket 237 captures the first upper frame rail member 210 adjacent the lower frame rail 230 to permit the connection between the frame rail members 210, 230.

The hydroforming process is limited to approximately 20% expansion of the tubular stock from which the respective frame components are made. As a result, the S-bend 231 of the lower frame rail 230 will normally have substantially the same length of line as the rearwardly and forwardly extending portions 232, 233. To provide proper support of the various subframe components to be mounted on the lower frame rails 230, the section properties of the S-bend 231 needs to be substantially identical to the unitized frame components being replaced, as is represented in FIGS. 15a and 15b. Since the hydroforming process cannot expand the shape of the tubular stock sufficiently, a sectional bracket 245 is formed to mate with the S-bend and, when attached to the lower frame rail 230, provides the same sectional properties as were previously found on the replaced frame components. The surface of the S-bend 231 is depicted with a dashed line in FIGS. 11 and 14, which defines the expanded sectional properties achieved with the addition of the sectional bracket 245 to the S-bend 231 of the lower frame rail 230. The addition of the section bracket 245 permits the hydroformed rear fame rail 230 to position the rear subframe mount bracket 239 in the same location as was know with the unitized frame structure 201.

Figure 14:
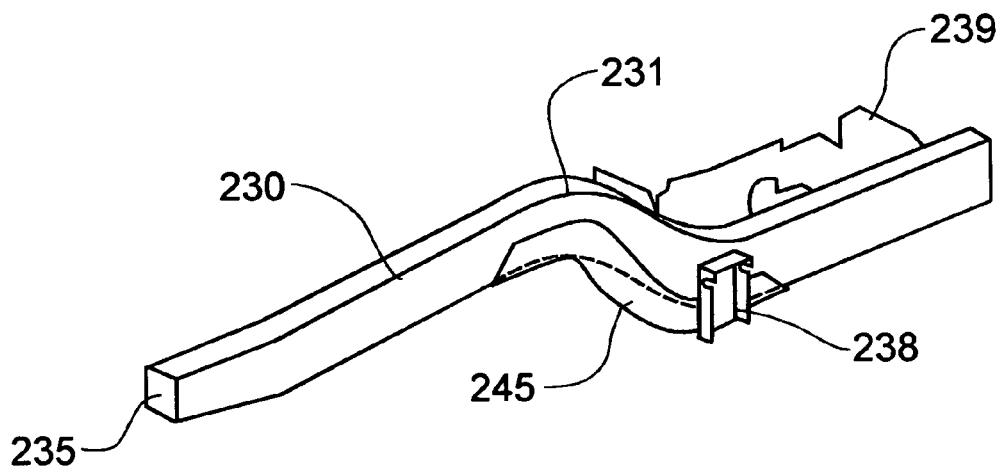
FIG. 14 is a left side perspective view of the right side lower frame rail having the section bracket and representative subframe brackets mounted thereon.
Figure 15B:
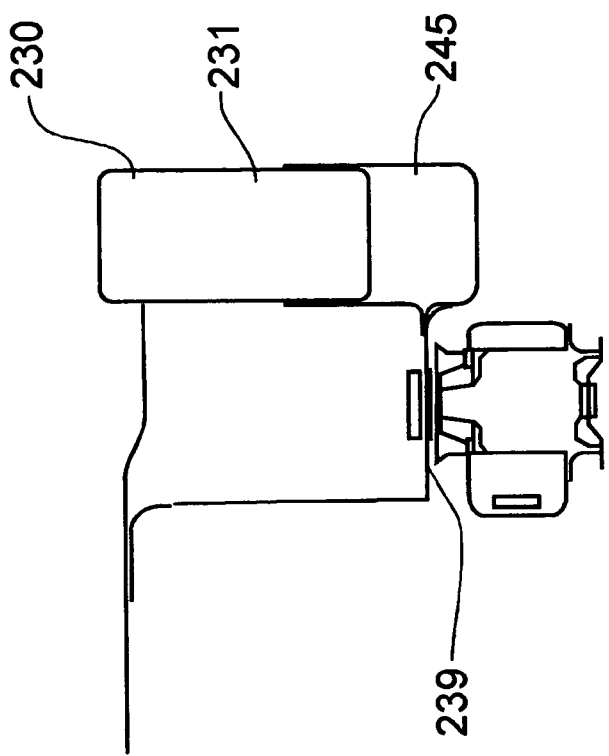
Figure 15A:
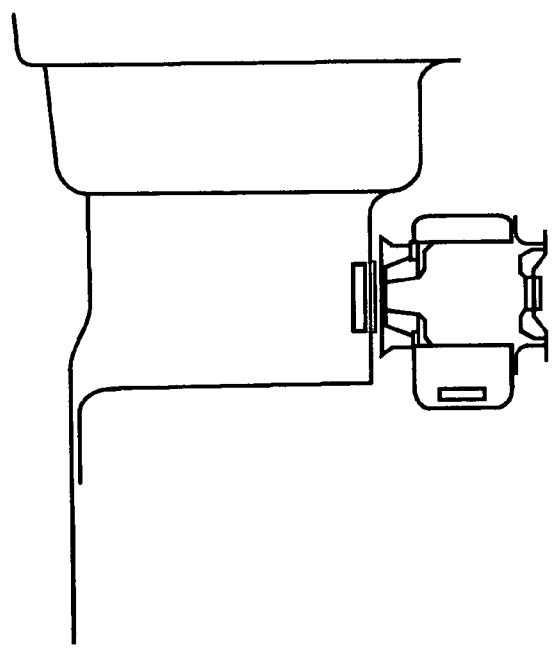
FIG. 15a is a schematic representation of the mounting of the rear subframe mount on a standard unitized frame constituting prior art structure.

As can best be seen in FIG. 14, the lower frame rail 230 can be pre-formed with mounting brackets as is represented by the first mounting bracket 238 attached to the sectional reinforcement 245 and the second mounting bracket 239 affixed to the rearwardly extending portion 232. Preferably, however, rear subframe mount is accomplished through the torque box (not shown).

In the above-described configuration, the opposing sides of the tubular front end structure 200 can be pre-assembled into a modular configuration and delivered to the automotive assembly line as a module for connection to the unitized frame 201. Preferably, the two upper frame rail members 210, 220, the lower frame rail 230, the shock tower 225 and the appropriate subframe mounting brackets 238, 239 are assembled and welded together to form a module corresponding to each respective side of the front end structure 200. In the alternative the two upper frame rail members 210, 220 and the shock tower 225 could be preassembled and welded together to form a first subassembly module for each respective side of the front end structure 200, while the lower frame rail 230, with sectional bracket 245 and attachment brackets 234, 237 for accepting the corresponding upper frame rail members 210, 220, along with the appropriate subframe mounting brackets 238, 239, affixed thereto, would form a second subassembly module for each respective side of the front end structure 200.

Once delivered to the automotive assembly line, the subassembly modules would be positioned on the A-pillar and welded thereto. The upper and lower radiator support members 240, 242 would then be welded to the opposing first upper frame rail members 210 and associated attachment brackets 219 to form the front end frame structure 200.

The fenders 207, hood hinges 208 and other operative module components (not shown) can be mounted on the front end structure 200 as appropriate, and the radiator, transmission cooler, condenser, radiator fan, etc. can be mounted to the upper and lower radiator support members to complete the assembly of the front end structure 200.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A front end assembly for a deployment on a vehicle having opposing A-pillars forming a part of a frame assembly, comprising:
   left and right upper frame rail assemblies connected to said A-pillar and projecting forwardly therefrom, said upper frame rail assembly supporting a shock tower, each said upper frame rail assembly including first and second upper frame rail members connected to the corresponding said A-pillar and projecting forwardly therefrom, said second upper frame rail member being spaced below said first upper frame rail member at the corresponding said A-pillar;
   left and right lower frame rail assemblies connected to said A-pillar below the corresponding said upper frame rail assemblies and extending forwardly therefrom; and
   a radiator support apparatus extending transversely between said upper frame rail assemblies forwardly of said A-pillars.

2. The front end assembly of claim 1, wherein said second upper frame rail member supports said shock tower.

3. The front end assembly of claim 2 wherein said first upper frame rail member is formed with a bend that positions said distal end inwardly and forwardly of the corresponding said A-pillar, said first upper frame rail member having a vertically oriented portion between said bend and said distal end.

4. The front end assembly of claim 3 wherein said second upper frame rail member is formed with a first bend to position a portion of said second upper frame rail member proximate to said first upper frame rail member, and a second bend to position a distal end thereof inwardly and forwardly of the corresponding said A-pillar.

5. The front end assembly of claim 4 wherein said lower frame rail assembly includes a longitudinally extending lower frame rail, said second upper frame rail member being connected to said lower frame rail at an intermediate position.

6. The front end assembly of claim 5 wherein said first upper frame rail member is connected to said lower frame rail near a terminal end of said lower frame rail, said terminal end extending forwardly of said first upper frame rail member.

7. The front end assembly of claim 5 wherein said first and second upper frame rail members are interconnected by a shear plate.

8. The front end assembly of claim 5 wherein said lower frame rail is formed with an S-bend extending between a rearwardly extending portion and a forwardly extending portion, said lower frame rail having a section reinforcement affixed to said S-bend to increase said cross-sectional configuration of said lower frame rail at said S-bend.

9. The front end assembly of claim 5 wherein said radiator support apparatus includes an upper radiator support member extending between corresponding said bends in said left and right first upper frame rail members and a lower radiator support member extending transversely between the corresponding said distal ends of said left and right first upper frame rail members.

10. The front end assembly of claim 9 wherein each of said first and second upper frame rail members, said lower frame rails, and said upper and lower radiator support members are formed through a hydroforming process.

11. A front end assembly for a unitized automobile frame having a pair of opposing A-pillars, comprising:
   a first upper frame rail member connected to each said A-pillar at a first location and extending forwardly therefrom, each said first upper frame rail member being formed with a bend extending a distal end thereof inwardly and forwardly of the corresponding said A-pillar;
   a second upper frame rail member connected to each said A-frame pillar at a second location spaced below said first location and extending forwardly therefrom, each said second upper frame rail member being formed with a first bend positioning a portion of said second upper frame rail member proximate to said first upper frame rail member and a second bend following said first bend to position a distal end thereof inwardly and forwardly of the corresponding said A-pillar, each said second upper frame rail member supporting a shock tower;
   a lower frame rail connected to each said A-pillar at a third location below said second location and extending forwardly thereof, said lower frame rail terminating in a terminal end; and
   a first radiator support member extending transversely between corresponding portions of said first upper frame rail members.

12. The front end assembly of claim 11 wherein said lower frame rail is formed with an S-bend extending between a rearwardly extending portion and a forwardly extending portion, said lower frame rail having a section bracket affixed to said S-bend to increase said cross-sectional configuration of said lower frame rail at said S-bend.

13. The front end assembly of claim 12 wherein each said lower frame rail includes a first attachment bracket attached to said lower frame rail at said intermediate position, said distal end of said second lower frame rail member being received within said first attachment bracket.

14. The front end assembly of claim 13 wherein each said first upper frame rail member is connected to the corresponding said lower frame rail near the terminal end thereof with said terminal end extending forwardly of the corresponding said first upper frame rail member.

15. The front end assembly of claim 14 further comprising a second radiator support member extending between said distal ends of the opposing said first upper frame rail members, said first radiator support extending between the bends in the opposing said first upper frame rail members.

16. A method of assembling a vehicle front end to a unitized frame having a pair of transversely spaced A-pillars, comprising the steps of:
   assembling left and right tubular frame assemblies having a rearward attachment portion and a forward terminal end including the steps of:

providing a first upper frame rail member oriented in a generally longitudinally extending configuration to a bend extending a distal end of said first upper frame rail member inwardly and forwardly of the corresponding said A-pillar, said first upper frame rail member including a vertically oriented portion between said bend and said distal end;

positioning a second upper frame rail member positioned below said first upper frame rail member, said second upper frame rail member having a first bend locating a portion of said second upper frame rail member proximate to said first upper frame rail member, and a second bend to locate a distal end thereof inwardly and forwardly of the corresponding said A-pillar;

connecting said first and second upper frame rail members together; and mounting a shock tower on said second upper frame rail member;

attaching each of said left and right tubular frame assemblies to the corresponding said A-pillar; and interconnecting said left and right tubular frame assemblies by a transversely extending radiator support apparatus.

17. The method of claim 16 wherein said assembling step further includes the steps of:

providing a lower frame rail oriented in a longitudinal configuration;

attaching said second upper frame rail member to said lower frame rail by engaging said distal end with an attachment bracket located at an intermediate location along said lower frame rail; and affixing said first upper frame rail member to said lower frame rail adjacent to a forward terminal end of said lower frame rail.

18. The method of claim 17 wherein said assembling step still further includes the steps of:

forming said lower frame rail through a hydroforming process so as to have an S-bend therein between a rearwardly extending portion and a forwardly extending portion; and attaching a section bracket to said lower frame rail at said S-bend to increase the cross-section configuration of said lower frame rail at said S-bend.

19. The method of claim 18 wherein said interconnecting step includes the steps of:

connecting an upper radiator support member between corresponding bends in said first upper frame rail members; and connecting a lower radiator support member between the distal ends of said opposing first upper frame rail members.

* * * * *